UNITED STATES PATENT OFFICE.

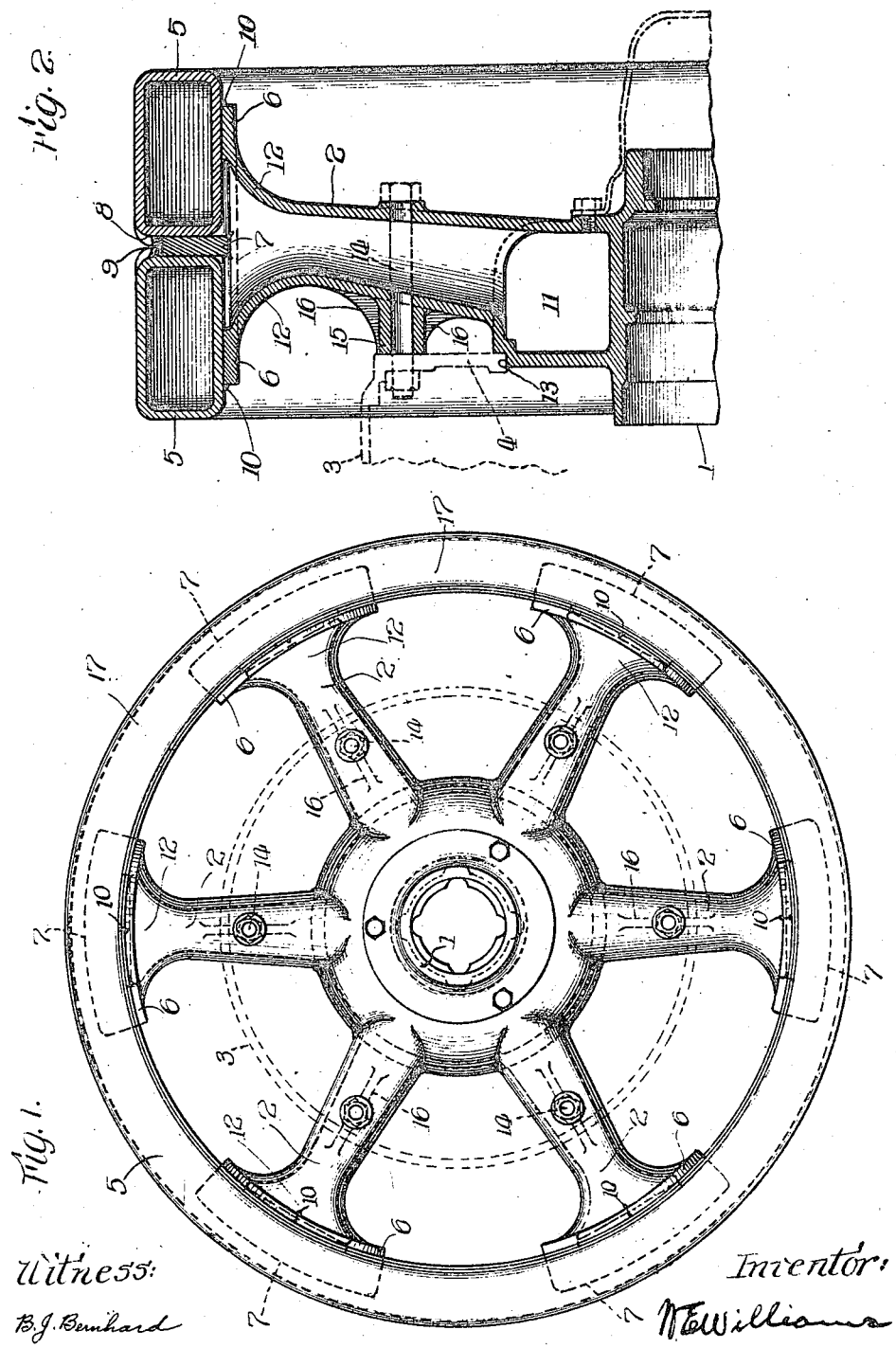

WILLIAM ERASTUS WILLIAMS, OF CHICAGO, ILLINOIS.

HOLLOW-ROLLED-RIM WHEEL.

1,379,843.          Specification of Letters Patent.     Patented May 31, 1921.

Application filed December 8, 1919. Serial No. 343,352.

*To all whom it may concern:*

Be it known that I, WILLIAM ERASTUS WILLIAMS, a citizen of the United States, a resident of Chicago, in the county of Cook and State of Illinois, have invented a new and useful Improvement in Hollow-Rolled-Rim Wheels, of which the following is a specification.

The object of my invention is to make a cheap, very strong and light wheel for automobile truck use, which has a cast hub and spider, but a hollow rolled rim.

The invention is set forth in the claims.

Reference will be had to the accompanying drawings, in which Figure 1 is a front elevation of the wheel and Fig. 2 is a section in the plane of the axes of the hub and a spoke on a larger scale than that of Fig. 1, showing only one-half of the wheel.

The wheel shown in these drawings is for a type of automobile truck wherein the solid rubber tires are "pressed on," as will be understood generally by those skilled in the art.

In the drawings, 1 indicates the ordinary hub of an automobile truck wheel, and two indicates a hollow spoked spider which forms the spokes of the wheel, and this spider is herein shown as being integral with the hub.

3 shows in dotted lines, the ordinary brake drum broken away. 4 shows the flange of the said brake drum as the same is secured to the spider of my wheel.

I prefer to make my rim of two pieces of pipe 5, rectangular in cross section, bent to circular form, and welded to form two complete rings. I provide the spokes of my spider with flanged ends 6 and, extending across those flanges in the plane of the wheel I provide the bridge or radially extending flange 7.

The rings 5 are laterally indented at 8 and when pressed over the spider from opposite sides, respectively, the flanges 7 fit and fill the central portions of the indentations. The flanges 7 are then peripherally welded to the adjacent walls of the indentations, as indicated at 9, securing the rings to the spider, but as an added security, fillets 10 are welded in the angles made by the tubes and the lateral spoke flanges. The spokes are hollow and the cavities therein are continuous with an annular space 11 in a central hub enlargement, and thereby a single core serves advantageously in casting the wheel.

The flanges 7 bridge across the core cavities at the end of the spokes and thus strengthen the bell ends of the spokes. These bell ends are indicated by the gentle curves 12, which add to the appearance of the wheel, stiffen the spoke ends and facilitate the casting of the ends.

The brake drum flange 4 is secured to the spider through the medium of the shoulders 13, for radial alinement and is bolted laterally by means of bolts 14. Bosses 15 are provided on the spokes to furnish abutting faces for the flange 4 under the nut of the bolts.

These bosses 15 are braced on the spider walls by flanges 16.

The hollow sectional rolled pipe rim rings 5 may be made of very thin metal and yet be very strong and meet the requirements of the tread of the wheel at a very low cost. Radially alined walls of the pipes, both at the margin and in the center, furnish the necessary resistance against collapsing, while the box girder section makes this rim stiff at the zones or regions 17, between the ends of the spider.

It has been a common practice to make cast spiders with rolled rims, but the difficulty with these is that the rims ordinarily have been weak between the spoked ends and such designs are not desirable designs for automobile trucks and many other purposes.

With my hollow rectangular shaped pipe section, I get a very stiff girder between the spoke ends and yet keep the weight of the wheel down to a very low point, much lower than is possible using a single piece of flat metal, even though the latter is very much heavier.

What I claim is:—

1. In a metal wheel, the combination with a spider, of two tubular, rigidly connected rim rings of circumferentially continuous metal, rectangular in cross section, lying side by side, encircling the spokes, and rigidly connected thereto.

2. The combination with a wheel spider having tubular spokes provided with lateral flanges at their outer ends, of a rim composed of circumferentially continuous rectangular tubes, side by side, encircling the spoke ends and rigidly connected to each spoke and to each other.

3. In a metal wheel, the combination with a spider having the ends of its spokes provided with laterally extending flanges and with central peripheral projections, of tubular rings lying on opposite sides of said projections and recessed to receive the latter, and means for rigidly connecting the rings to each other and to the spoke ends.

4. In a metal wheel, a spider having its spoke ends, respectively, provided with marginal lateral flanges and with a flange projecting outward parallel to the plane of the wheel, and an annular rim member secured rigidly, alongside the last mentioned flange.

5. In a metal wheel, the combination with a spider having its spokes provided at their ends with lateral circumferential flanges and with flanges extending across the ends of the spokes, respectively, of annular rim members encircling the circumferential flanges on opposite sides, respectively, of the end-crossing flange, and secured to the flanges.

6. A metal wheel rim composed of similar rigidly connected rings side by side and laterally recessed on their meeting faces to receive spoke ends, spoke ends projecting outwardly in said recesses and terminally welded to the rings at points within the peripheral surface thereof.

7. The combination with a cast wheel spider having bell shaped spoke ends provided with lateral circumferential flanges and with integral flanges extending across the spoke ends diametrically, whereby rim rings may be forced over said circumferential flanges on each side of said integral flanges.

Signed at Chicago, in the county of Cook and State of Illinois, this 1st day of December, 1919.

WILLIAM ERASTUS WILLIAMS.

Witnesses:
B. J. BERNHARD,
J. B. JEFFERSON.